(12) United States Patent
Atragene et al.

(10) Patent No.: US 10,281,061 B2
(45) Date of Patent: May 7, 2019

(54) CLIP AND CLIP ARRANGEMENT

(71) Applicant: Lear Corporation, Southfield, MI (US)

(72) Inventors: Maurizio Atragene, Rivalta di Torino (IT); Paolo Cagnetta, Turin (IT); Stefano Demichelis, Grugliasco (IT)

(73) Assignee: Lear Corporation, Southfield, MI (US)

( * ) Notice: Subject to any disclaimer, the term of this patent is extended or adjusted under 35 U.S.C. 154(b) by 255 days.

(21) Appl. No.: 15/014,157

(22) Filed: Feb. 3, 2016

(65) Prior Publication Data

US 2017/0219125 A1    Aug. 3, 2017

(51) Int. Cl.
*F16L 3/13* (2006.01)
*F16B 2/22* (2006.01)
*F16B 2/00* (2006.01)
*B60R 16/02* (2006.01)

(52) U.S. Cl.
CPC ............ *F16L 3/13* (2013.01); *B60R 16/0215* (2013.01); *F16B 2/005* (2013.01); *F16B 2/22* (2013.01)

(58) Field of Classification Search
CPC ..... F16L 3/13; B60R 16/0215; F16M 13/022; F16B 2/22; F16B 2/005
USPC ............................ 248/70, 73, 74.1, 74.2, 262
See application file for complete search history.

(56) References Cited

U.S. PATENT DOCUMENTS

| | | | | |
|---|---|---|---|---|
| 3,954,238 A * | 5/1976 | Nivet | ................... | F16L 3/1075 248/68.1 |
| 4,371,137 A * | 2/1983 | Anscher | ..................... | F16L 3/23 24/16 PB |
| 4,397,438 A * | 8/1983 | Chapman | ................. | E05B 19/00 248/229.16 |
| 4,935,992 A * | 6/1990 | Due | .......................... | F16L 3/23 24/16 R |
| 5,024,405 A * | 6/1991 | McGuire | ............... | F16B 7/0493 24/16 PB |
| 5,555,607 A * | 9/1996 | Parveris | .................... | F16L 3/13 24/129 R |
| 5,669,709 A * | 9/1997 | Adams | ..................... | F21V 21/08 362/145 |
| 5,806,819 A * | 9/1998 | Martone | ................... | F16B 2/10 24/16 PB |
| 6,094,801 A | 8/2000 | Howe | | |
| 6,164,605 A * | 12/2000 | Drake | .................... | B60T 17/046 24/16 PB |
| 6,206,331 B1 * | 3/2001 | Keith | ................... | B60R 16/0215 248/73 |
| 6,561,206 B1 * | 5/2003 | Wilkinson | ........... | A61H 3/0244 135/65 |
| 6,636,679 B1 * | 10/2003 | Mereness | ............. | G02B 6/4471 385/136 |
| 6,644,836 B1 * | 11/2003 | Adams | ..................... | F21V 21/08 362/145 |

(Continued)

FOREIGN PATENT DOCUMENTS

EP        1529997 B1    12/2012

*Primary Examiner* — Muhammad Ijaz
(74) *Attorney, Agent, or Firm* — Brooks Kushman P.C.

(57) ABSTRACT

A clip and clip arrangement for mounting a tubular member to a support member. The clip may have a tubular member receiving portion and a mounting portion. The tubular member receiving portion may have first and second arcuate arms that cooperate to define a cavity for receiving the tubular member. The mounting portion may extend from the tubular member receiving portion and may have an arcuate mounting arm.

20 Claims, 4 Drawing Sheets

(56) References Cited

U.S. PATENT DOCUMENTS

| | | | |
|---|---|---|---|
| 6,899,304 B2 | 5/2005 | Bellmore et al. | |
| 7,107,653 B2 * | 9/2006 | Thompson | H02G 3/30 24/16 PB |
| 7,294,789 B1 | 11/2007 | Watthanasintham | |
| 7,370,839 B2 * | 5/2008 | Putman | A47H 1/102 248/251 |
| D578,383 S * | 10/2008 | Adams | D8/367 |
| 7,533,853 B2 | 5/2009 | Ogawa | |
| 7,753,320 B2 | 7/2010 | Geiger et al. | |
| 8,183,471 B2 * | 5/2012 | Handler | H02G 3/0431 174/480 |
| D774,629 S * | 12/2016 | Rendle | D23/267 |
| 2011/0272535 A1 * | 11/2011 | Schmidt | F16L 3/1041 248/70 |
| 2014/0060922 A1 | 3/2014 | Weyrich et al. | |
| 2015/0122957 A1 * | 5/2015 | Michiels | F16L 3/1075 248/74.2 |

\* cited by examiner

CLIP AND CLIP ARRANGEMENT

TECHNICAL FIELD

This disclosure relates to a clip for receiving a tubular member, such as a wiring harness, and a clip arrangement.

BACKGROUND

A clip structure and wire-like member fixing method is disclosed in U.S. Pat. No. 7,533,853.

SUMMARY

In at least one embodiment, a clip is provided. The clip may have a tubular member receiving portion and a mounting portion. The tubular member receiving portion may have a first arcuate arm and a second arcuate arm. The first arcuate arm in the second arcuate arm may cooperate to define a cavity for receiving a tubular member. The mounting portion may extend from the tubular member receiving portion. The mounting portion may have an arcuate mounting arm that may be disposed substantially parallel to the second arcuate arm. The second arcuate arm may be disposed between the first arcuate arm and the arcuate mounting arm.

In at least one embodiment, a clip arrangement is provided. The clip arrangement may include a support member, a clip, and a tubular member. The clip may be disposed on the support member. The clip may include a tubular member receiving portion and a mounting portion. The tubular member receiving portion may have a first arcuate arm and a second arcuate arm. The first arcuate arm and the second arcuate arm may cooperate to define a cavity. The mounting portion may extend from the tubular member receiving portion. The mounting portion may have an arcuate mounting arm that may be disposed substantially parallel to the second arcuate arm. The tubular member may be received in the cavity. The support member may be disposed between the second arcuate arm and the arcuate mounting arm.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
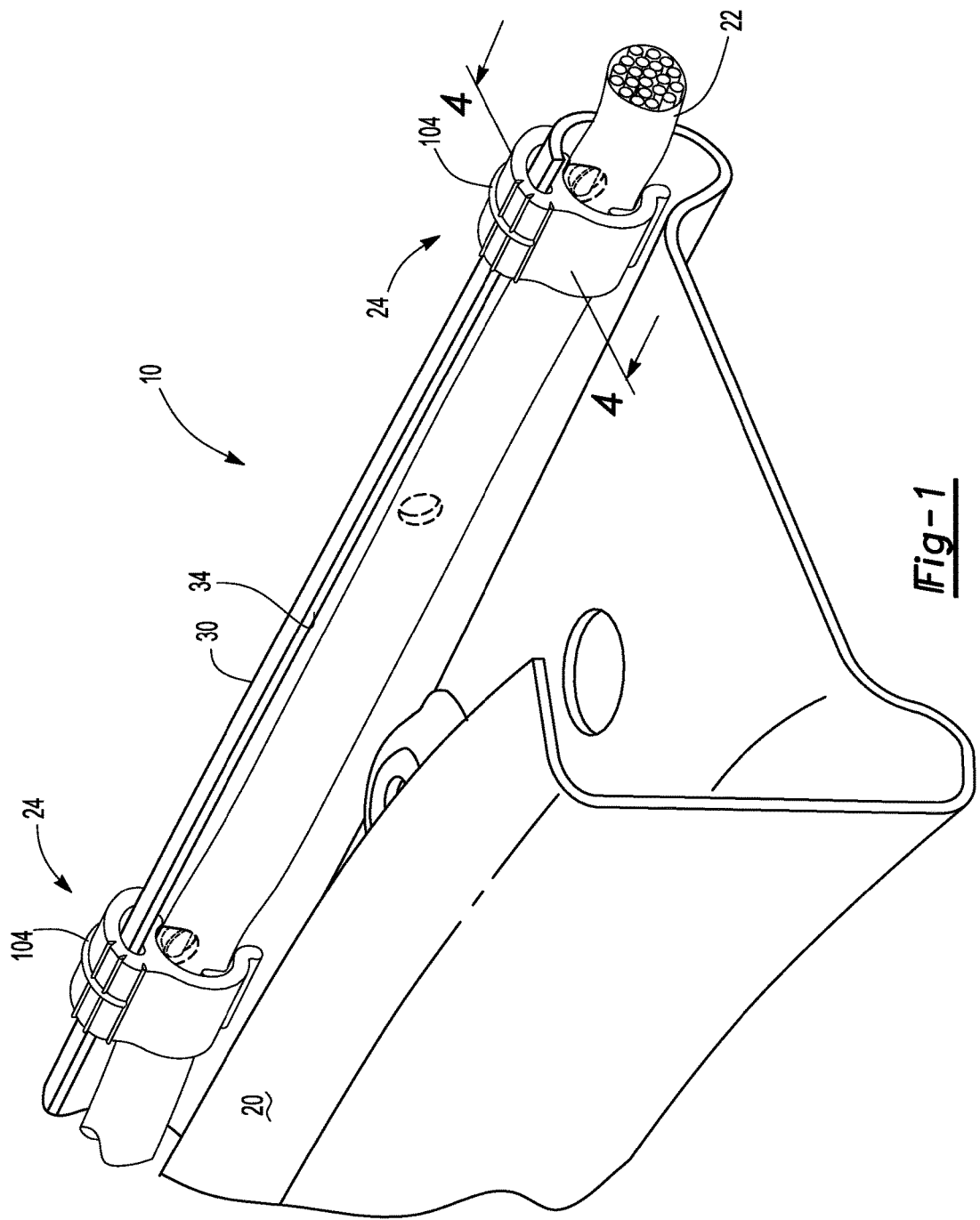
FIG. 1 is a perspective view of an exemplary clip arrangement.

Referring to FIG. 1, an exemplary clip arrangement 10 is shown. The clip arrangement 10 may include a support member 20, a tubular member 22, and a clip 24.

The support member 20 may be a structural component to which the clip 24 may be attached. In a vehicular application, the support member 20 may be disposed inside or outside a passenger compartment of a vehicle. For instance, the support member 20 may be a vehicle frame or body structure or may be an interior component, such as a trim panel or a seat assembly. In FIG. 1, the support member 20 is configured as a seat backrest frame of a vehicle seat assembly. In at least one embodiment, the support member 20 may have a curved or arcuate wall 30 and a hole 32, which is best shown in FIG. 4.

Figure 4:
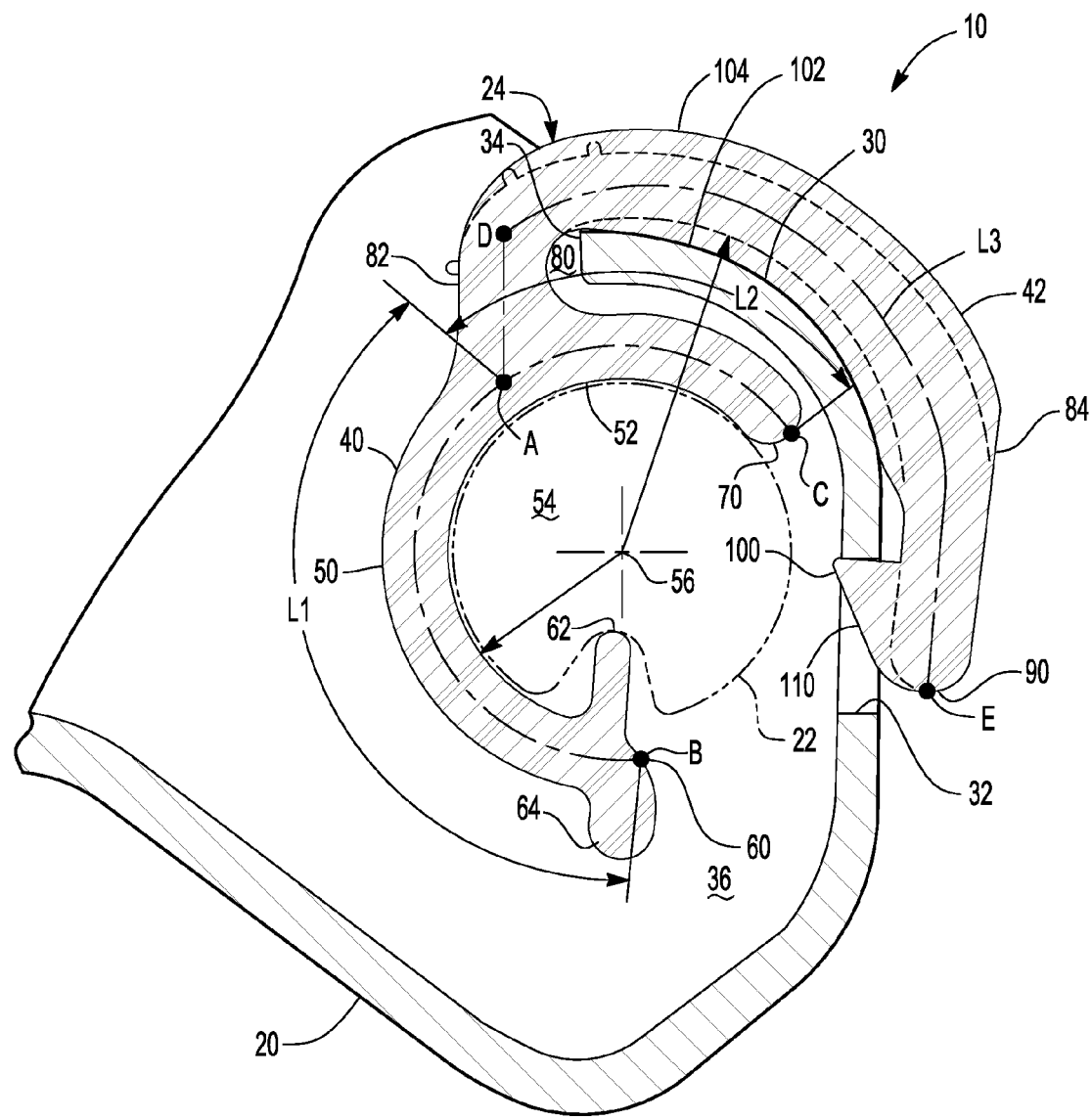
FIG. 4 is a section view of the clip arrangement of FIG. 1 along section line 4-4.

Referring to FIGS. 1 and 4, the arcuate wall 30 may extend along a curve or arc between a wall end surface 34 and the hole 32. The arcuate wall 30 may at least partially define a wall cavity 36. The wall cavity 36 may receive the tubular member 22 and at least a portion of the clip 24.

The hole 32 may be spaced apart from the wall end surface 34 and may be configured as a through hole or a blind hole. The hole 32 may receive a portion of the clip 24 to help secure the clip 24 to the support member 20 as will be discussed in more detail below.

The tubular member 22 may be disposed in the wall cavity 36 and may be received in the clip 24. The tubular member 22 may be a wire or wire harness that may have a generally cylindrical configuration.

One or more clips 24 may be provided to attach the tubular member 22 to the support member 20. For example, a plurality of clips 24 may be provided that may be disposed on the arcuate wall 30 of the support member 20 and may be spaced apart from each other. The tubular member 22 may extend through each clip 24.

Figure 2:
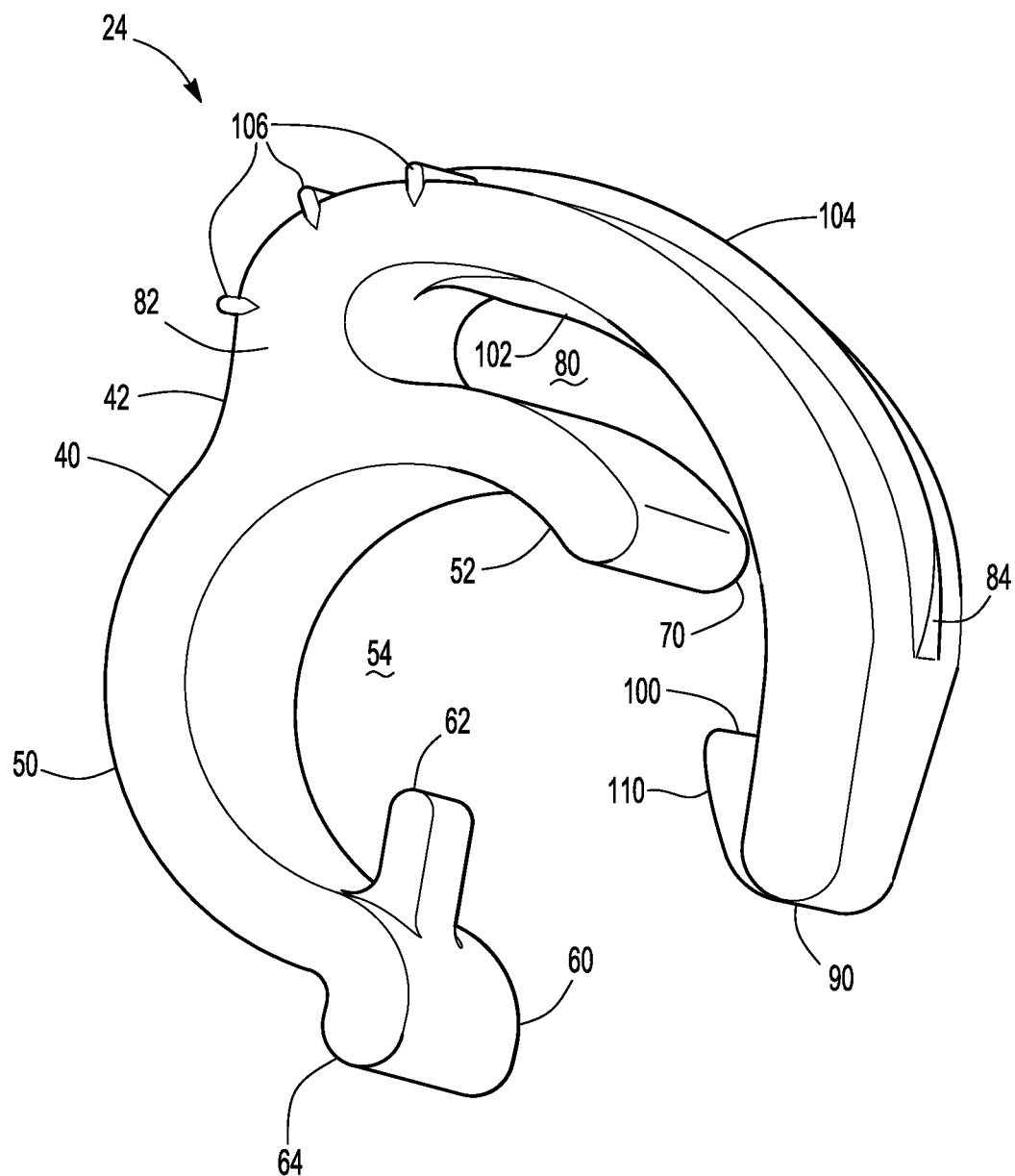
FIGS. 2 and 3 are perspective views of a clip that may be provided with the clip arrangement.
Figure 3:
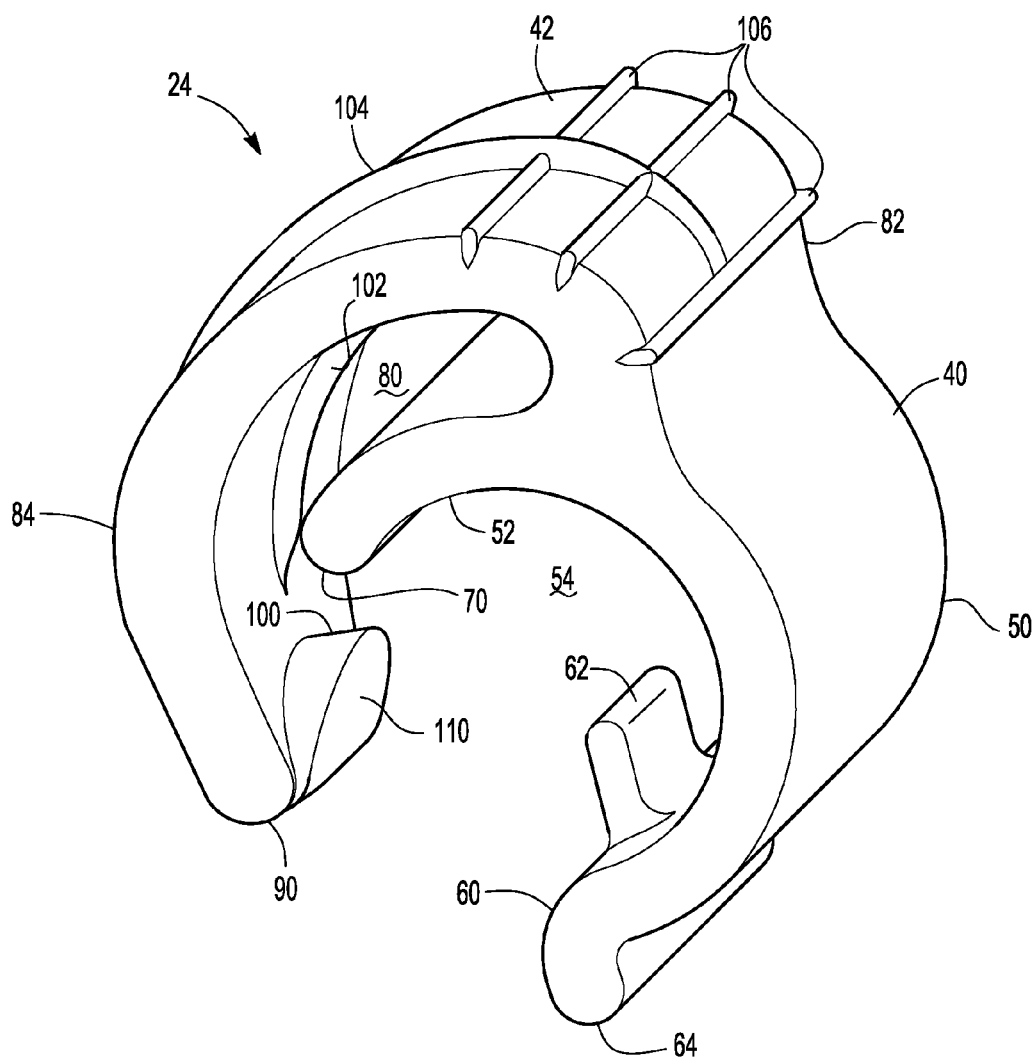

Referring to FIGS. 2-4, a clip 24 is shown in more detail. The clip 24 may have a unitary or one-piece construction. In addition, the clip 24 may be made of any suitable material, such as a polymeric material that may be injection molded to a desired shape. In at least one embodiment, the clip 24 may include a tubular member receiving portion 40 and a mounting portion 42.

The tubular member receiving portion 40 may be configured to receive and hold the tubular member 22. In at least one embodiment, the tubular member receiving portion 40 may have a first arcuate arm 50 and a second arcuate arm 52. The first arcuate arm 50 and the second arcuate arm 52 may cooperate to define a cavity 54 that may receive the tubular member 22.

The first arcuate arm 50 may extend along a curve or arc. As is best shown in FIG. 4, the first arcuate arm 50 or an interior surface thereof may be radially disposed with respect to a cavity axis 56. The cavity axis 56 may be disposed at the center of the cavity 54. The first arcuate arm 50 may have a length L1 that may extend from point A where the first arcuate arm 50 intersects the second arcuate arm 52 to point B. In addition, the first arcuate arm 50 may extend from the second arcuate arm 52 and may have a distal end 60 and a projection 62.

The distal end 60 may be disposed at a free end of the first arcuate arm 50. The distal end 60 may include a guide feature 64. The guide feature 64 may extend away from the cavity axis 56 or may curve away from the cavity axis 56 and may help guide and facilitate insertion of the tubular member 22 between the first arcuate arm 50 and the second arcuate arm 52 and into the cavity 54.

The projection 62 may be disposed proximate the distal end 60 of the first arcuate arm 50. The projection 62 may extend partially across the cavity 54 from an interior surface of the first arcuate arm 50. As such, the projection 62 may engage the tubular member 22 or may be received in an opening in the tubular member 22 to help retain the tubular member 22 in the cavity 54. As is best shown in FIG. 4, the projection 62 may extend from the interior surface of the first arcuate arm 50 toward the second arcuate arm 52. The projection 62 may also extend toward the cavity axis 56. For instance, the projection 62 may extend substantially perpendicular to the cavity axis 56 and may be spaced apart from the cavity axis 56.

The second arcuate arm 52 may extend from the first arcuate arm 50. In addition, the second arcuate arm 52 may be disposed between the first arcuate arm 50 and the mounting portion 42. Like the first arcuate arm 50, the second arcuate arm 52 may extend along a curve or arc. For example, the second arcuate arm 52 or an interior surface thereof may be radially disposed with respect to the cavity axis 56 as is best shown in FIG. 4. Moreover, the second arcuate arm 52 may be disposed at the same radial distance from the cavity axis 56 as the first arcuate arm 50. The second arcuate arm 52 may have a length L2 that may extend from point A to point C, in which point C may be disposed at a distal end 70 or free end of the second arcuate arm 52. The length L2 of the second arcuate arm 52 may be less than the length L1 of the first arcuate arm 50.

The mounting portion 42 may extend from the tubular member receiving portion 40. The mounting portion 42 may extend partially around the tubular member receiving portion 40 and may cooperate with the tubular member receiving portion 40 to define a mounting cavity 80 that may receive the support member 20 as will be discussed in more detail below. In at least one embodiment, the mounting portion 42 may include a connecting arm 82 and an arcuate mounting arm 84.

The connecting arm 82 may extend from the tubular member receiving portion 40. For example, the connecting arm 82 may extend from the first arcuate arm 50 and/or the second arcuate arm 52 to the arcuate mounting arm 84. In at least one embodiment, the connecting arm 82 may extend from point A to point D and may be disposed substantially parallel to the projection 62 as is best shown in FIG. 4.

The arcuate mounting arm 84 may extend from an end of the connecting arm 82. The arcuate mounting arm 84 may extend along a curve or arc. For example, the arcuate mounting arm 84 or an interior surface thereof may be radially disposed with respect to the cavity axis 56. In addition, the arcuate mounting arm 84 may be disposed at a greater radial distance from the cavity axis 56 than the first arcuate arm 50 and the second arcuate arm 52.

The arcuate mounting arm 84 may have a length L3 that may extend from point D to point E, in which point E may be disposed at a distal end 90 or free end of the arcuate mounting arm 84. The length L3 of the arcuate mounting arm 84 may be greater than the length L1 of the first arcuate arm 50 and may also be greater than the length L2 of the second arcuate arm 52. In addition, the arcuate mounting arm 84 may extend over or may extend around the second arcuate arm 52. For example, the arcuate mounting arm 84 may be disposed substantially parallel to the second arcuate arm 52 and may be spaced apart from the second arcuate arm 52 such that the arcuate mounting arm 84 may not engage the second arcuate arm 52. As such, the second arcuate arm 52 may be disposed between the first arcuate arm 50 and the arcuate mounting arm 84. The arcuate mounting arm 84 and the second arcuate arm 52 may cooperate to at least partially define the mounting cavity 80. In at least one embodiment the arcuate mounting arm 84 may include a retention barb 100, an inner rib 102, an outer rib 104, and one or more lateral ribs 106.

The retention barb 100 may be disposed at the distal end 90 of the arcuate mounting arm 84. The retention barb 100 may extend from an interior surface of the arcuate mounting arm 84 toward the cavity 54. As is best shown in FIG. 4, the retention barb 100 may be received in the hole 32 in the support member 20 to help secure the clip 24 to the support member 20. The retention barb 100 may include an angled surface 110 that may generally extend from the distal end 90 of the arcuate mounting arm 84 toward the distal end 70 of the second arcuate arm 52 to help direct and facilitate insertion of the tubular member 22 into the cavity 54.

The inner rib 102 may be disposed along an interior surface of the arcuate mounting arm 84. The inner rib 102 may extend inwardly toward the second arcuate arm 52. In addition, the inner rib 102 may extend from the connecting arm 82 toward the retention barb 100. The inner rib 102 may be spaced apart from the retention barb 100 in one or more embodiments. The inner rib 102 may help reinforce the arcuate mounting arm 84 and may engage and optionally interlock with the support member 20 to help facilitate positioning of the clip 24 with respect to the support member 20.

The outer rib 104 may be disposed opposite the inner rib 102. As such, the outer rib 104 may be disposed along an exterior surface of the arcuate mounting arm 84. The outer rib 104 may extend outwardly away from the second arcuate arm 52 and may extend from the connecting arm 82 toward the distal end 90 of the arcuate mounting arm 84. The outer rib 104 may help reinforce the arcuate mounting arm 84.

Referring to FIGS. 2 and 3, one or more lateral ribs 106 may be provided on the mounting portion 42. For instance, one or more lateral ribs 106 may be provided on the connecting arm 82 and/or the arcuate mounting arm 84. The lateral ribs 106 may be disposed on an exterior surface of the mounting portion 42 that may face away from the second arcuate arm 52. A lateral rib 106 may intersect the outer rib 104. In addition, the lateral ribs 106 may be disposed substantially perpendicular to the outer rib 104 in one or more embodiments to help laterally reinforce the clip 24.

The clip arrangement 10 may be assembled in the following manner. First, one or more clips 24 may be installed on the tubular member 22. More specifically, the tubular member 22 may be received in the cavity 54 and the projection 62 may engage the tubular member 22 to help hold the tubular member 22 in the cavity 54 and help hold the clip 24 on the tubular member 22. As such, the tubular member 22 and clips 24 may be assembled with a snap-fit engagement. Next, the clips 24 may be installed onto the support member 20. The clips 24 may be installed onto the support member 20 by sliding the clips 24 onto the arcuate wall 30 of the support member 20 such that the arcuate wall 30 may be received in the mounting cavity 80 between the second arcuate arm 52 and the arcuate mounting arm 84. The retention barb 100 may snap into the hole 32 in the arcuate wall 30 when the clip 24 is properly positioned.

As an alternative, it is contemplated that one or more clips 24 may be installed on the support member 20 before the tubular member 22 is mounted to the clip 24.

The clip and clip arrangement described above may allow a tubular member or wiring harness to be installed on another component without the use of separate fasteners that may be provided in addition to the clip. In addition, the clip and clip arrangement may allow components to be assembled with a snap-fit engagement that may provide audible, visual, and/or tactile feedback when properly assembled.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A clip comprising:
a tubular member receiving portion having a first arcuate arm and a second arcuate arm that cooperate to define a cavity for receiving a tubular member; and
a mounting portion that extends from the tubular member receiving portion and has an arcuate mounting arm that is spaced apart from the first arcuate arm and the second arcuate arm and is disposed substantially parallel to the second arcuate arm, wherein the second arcuate arm is disposed between the first arcuate arm and the arcuate mounting arm, the arcuate mounting arm has a retention barb disposed proximate a distal end of the arcuate mounting arm, interior surfaces of the first arcuate arm, second arcuate arm, and arcuate mounting arm face toward and are radially disposed with respect to a cavity axis disposed at a center of the cavity, a guide feature that extends away from the cavity axis is disposed at a distal end of the first arcuate arm, and a projection that extends toward the cavity axis is disposed opposite the guide feature and is spaced apart from the distal end of the first arcuate arm.

2. The clip of claim 1 wherein the projection is disposed proximate the distal end of the first arcuate arm and the projection extends toward the second arcuate arm.

3. The clip of claim 1 wherein the arcuate mounting arm has a length that is greater than a length of the second arcuate arm.

4. The clip of claim 1 wherein the arcuate mounting arm has an inner rib.

5. The clip of claim 1 wherein the retention barb extends toward the cavity.

6. The clip of claim 1 wherein the arcuate mounting arm has an inner rib that extends toward the second arcuate arm such that the inner rib is spaced apart from the second arcuate arm and extends from a side of the arcuate mounting arm that faces toward the second arcuate arm.

7. A clip comprising:
a tubular member receiving portion having a first arcuate arm and a second arcuate arm that cooperate to define a cavity for receiving a tubular member; and
a mounting portion that extends from the tubular member receiving portion and has an arcuate mounting arm that is spaced apart from the first arcuate arm and the second arcuate arm and is disposed substantially parallel to the second arcuate arm, wherein the second arcuate arm is disposed between the first arcuate arm and the arcuate mounting arm, the arcuate mounting arm has a retention barb disposed proximate a distal end of the arcuate mounting arm, interior surfaces of the first arcuate arm, second arcuate arm, and arcuate mounting arm face toward and are radially disposed with respect to a cavity axis disposed at a center of the cavity, the first arcuate arm has a projection disposed proximate a distal end of the first arcuate arm, wherein the projection extends toward the second arcuate arm, and the mounting portion has a connecting arm that extends from the tubular member receiving portion to the arcuate mounting arm, wherein the projection extends substantially parallel to the connecting arm.

8. The clip of claim 7 wherein a guide feature that extends away from the cavity axis is disposed at the distal end of the first arcuate arm and the projection extends toward the cavity axis and is disposed opposite the guide feature and is spaced apart from the distal end of the first arcuate arm.

9. A clip comprising:
a tubular member receiving portion having a first arcuate arm and a second arcuate arm that cooperate to define a cavity for receiving a tubular member; and
a mounting portion that extends from the tubular member receiving portion, the mounting portion having an arcuate mounting arm that is disposed substantially parallel to the second arcuate arm, the arcuate mounting arm having an inner rib that extends toward the second arcuate arm and a retention barb disposed proximate a distal end of the arcuate mounting arm, and a connecting arm that extends from the tubular member receiving portion, wherein the inner rib extends from the connecting arm toward the retention barb.

10. The clip of claim 9 wherein the inner rib is spaced apart from the retention barb.

11. The clip of claim 9 wherein the arcuate mounting arm has an outer rib that is disposed opposite the inner rib.

12. The clip of claim 11 wherein the arcuate mounting arm has a lateral rib that intersects the outer rib.

13. The clip of claim 12 wherein the lateral rib is disposed proximate the connecting arm and is disposed substantially perpendicular to the outer rib.

14. A clip arrangement comprising:
a support member;
a clip that is disposed on the support member, the clip including:
a tubular member receiving portion having a first arcuate arm and a second arcuate arm that cooperate to define a cavity; and
a mounting portion that extends from the tubular member receiving portion and has an arcuate mounting arm that is disposed substantially parallel to the second arcuate arm, wherein the support member is disposed between the second arcuate arm and the arcuate mounting arm; and
a tubular member that is received in the cavity.

15. The clip arrangement of claim 14 wherein the tubular member is a wire harness.

16. The clip arrangement of claim 14 wherein the support member has a hole and the arcuate mounting arm has a retention barb disposed proximate a distal end of the arcuate mounting arm, wherein the retention barb is disposed in the hole to secure the clip to the support member.

17. The clip arrangement of claim 14 wherein the first arcuate arm has a projection disposed proximate a distal end of the first arcuate arm, wherein the projection extends toward the second arcuate arm and engages the tubular member to secure the tubular member in the cavity.

18. The clip arrangement of claim 14 wherein the first arcuate arm is completely spaced apart from the arcuate mounting arm and the support member has an arcuate wall that extends along an arc between the second arcuate arm and the arcuate mounting arm.

19. The clip arrangement of claim 14 wherein the first arcuate arm, second arcuate arm, and arcuate mounting arm are radially disposed with respect to a cavity axis that is disposed at a center of the cavity.

20. The clip arrangement of claim 14 wherein the support member is a seat backrest frame.

* * * * *